US006397141B1

(12) United States Patent
Binnig

(10) Patent No.: US 6,397,141 B1
(45) Date of Patent: May 28, 2002

(54) METHOD AND DEVICE FOR SIGNALLING LOCAL TRAFFIC DELAYS

(75) Inventor: Gerd Binnig, Wollerau (CH)

(73) Assignee: Delphi 2 Creative Technologies GmbH (DE)

( * ) Notice: Subject to any disclaimer, the term of this patent is extended or adjusted under 35 U.S.C. 154(b) by 0 days.

(21) Appl. No.: 09/554,949

(22) PCT Filed: Nov. 13, 1998

(86) PCT No.: PCT/EP98/07283

§ 371 (c)(1), (2), (4) Date: Aug. 7, 2000

(87) PCT Pub. No.: WO99/26212

PCT Pub. Date: May 27, 1999

(30) Foreign Application Priority Data

Nov. 17, 1997 (DE) ........................................ 197 50 942

(51) Int. Cl.[7] ........................... G06F 19/00; G06F 7/70

(52) U.S. Cl. ....................... 701/117; 701/118; 340/903; 340/904

(58) Field of Search ............................ 701/1, 116, 117, 701/119; 340/903, 904, 991

(56) References Cited

U.S. PATENT DOCUMENTS 4,706,086 A * 11/1987 Panizza ...................... 340/902
5,428,544 A * 6/1995 Shyu .......................... 701/117

* cited by examiner

*Primary Examiner*—Gertrude Arthur
(74) *Attorney, Agent, or Firm*—Blakely Sokoloff Taylor & Zafman

(57) ABSTRACT

A method and an apparatus for signalling local traffic disturbances wherein a decentralised communication between vehicles is performed by exchanging their respective vehicle data. Through repeated evaluation of these individual vehicle data, each reference vehicle may determine a group of vehicles having relevance for itself from within a maximum group of vehicles and compare the group behavior of the relevant group with its own behavior. The results of this comparison are indicated in the reference vehicle, whereby a homogeneous flow of traffic may be generated, and the occurrence of accidents is reduced.

18 Claims, 3 Drawing Sheets

Fig. 4

| | | $t_{n-3}$ | $t_{n-2}$ | $t_{n-1}$ | $t_n$ |
|---|---|---|---|---|---|
| | IC | v / E | v / E | v / E | v / E |
| 0 | 0000 | 120 / — | 120 / — | 120 / — | 120 / — |
| 1 | 0001 | 100 / 70 | 100 / 80 | 100 / 90 | 100 / 100 |
| 2 | 0010 | 120 / 90 | 120 / 90 | 120 / 90 | 120 / 90 |
| 3 | 0011 | 100 / 50 | 100 / 60 | 100 / 70 | 100 / 80 |
| 4 | 0100 | 120 / 70 | 120 / 70 | 120 / 70 | 120 / 70 |
| 5 | 0101 | — / — | — / — | — / — | 80 / 90 |
| 6 | 0110 | — / — | — / — | — / — | 120 / 85 |
| 7 | 0111 | 120 / 80 | 120 / 80 | 120 / 80 | 120 / 80 |
| 8 | 1000 | 100 / 87 | 100 / 97 | 100 / 93 | 100 / 83 |
| 9 | 1001 | 100 / 100 | 100 / 90 | 100 / 80 | 100 / 70 |
| 10 | 1010 | — / — | — / — | — / — | 80 / 60 |
| 11 | 1011 | 120 / 60 | 120 / 60 | 120 / 60 | 120 / 60 |
| 12 | 1100 | — / — | — / — | — / — | 120 / 60 |

METHOD AND DEVICE FOR SIGNALLING LOCAL TRAFFIC DELAYS

This application is a 371 of PCT/EP98/07283 filed Nov. 13, 1998.

BACKGROUND OF THE INVENTION

1. Field of the Invention

The invention relates to a method and an apparatus for signalling local traffic disturbances, and in particular to a method and an apparatus for recognising and indicating accidents and an increased traffic volume as well as tailbacks caused thereby.

2. Description of the Related Art

In order to avoid tailbacks and accidents in the event of increased traffic volume, conventional traffic control systems have already been fixedly installed along road sections with particularly much traffic such as, for example, highly frequented highways, etc. Such conventional, fixedly installed traffic control systems possess a multiplicity of detection means detecting, for example, traffic density, the velocity of the flow of vehicles, environmental conditions (temperature, fog) etc., and control vehicle traffic through the respective detection signals along the predetermined section with the aid of indicator panels, so that a tailback or accidents are avoided where possible.

A drawback in the like conventional traffic control systems is the fixed installation along a predetermined route section which results in extraordinarily high costs for their acquisition. Moreover a like fixedly installed traffic control system only possesses low flexibility as it regulates, or controls, traffic only in relatively short section.

In order to enhance flexibility, U.S. Pat. No. 4,706,086 proposes a communication system between a multiplicity of automotive vehicles wherein signals and information corresponding to the respective running conditions of the automobile are transmitted via a transmitting/receiving device by means of electromagnetic radio waves.

From document U.S. Pat. No. 5,428,544 there are moreover known a device and a method for signalling local traffic disturbances, wherein the vehicle data or conditions, respectively, of the automobile such as, for example, speed, route and direction are mutually transmitted via communication means. Transmission of the respective data to another automotive vehicle is achieved in an indirect manner through a passing automobile travelling in the opposite direction. In addition, this conventional traffic information system requires a navigation module, a map module, and own-position determination apparatus for identifying one's own position. The like conventional communication systems do, however, present the drawback of definitely requiring a multiplicity of extraordinarily costly elements, such as, for example, a map memory, a navigation module and a positioning module for recognising one's own position.

From EP-A-0 715 286, a method for signalling local traffic disturbances in accordance with the preamble of claim 1, and an apparatus for signalling local traffic disturbances in accordance with the preamble of claim 10 are known.

BRIEF SUMMARY OF THE INVENTION

The invention is therefore based on the object of furnishing a method and an apparatus for signalling local traffic disturbances which may be furnished at relatively low cost, possess a high degree of flexibility, and are independent of fixedly installed detection means.

In accordance with the invention, this object is attained through the measures indicated in claim 1 with respect to the method, and through the measures indicated in claim 11 with respect to the apparatus.

Further advantageous embodiments of the present invention are the subject matters of the dependent claims.

To be more precise, a maximum group of vehicles to be considered is determined in accordance with a predetermined minimum signal level of an electromagnetic radio signal emitted by a respective multiplicity of vehicles. The individual vehicle data transmitted by the radio signal and representing the respective moving conditions of the vehicles located within the reception range are repeatedly evaluated and memorised. With the aid of the memorised vehicle data, a group of reference vehicles relevant for a respective vehicle to be examined within the maximum group of vehicles to be examined is determined by evaluating the individual vehicle data. Subsequently the group behavior within the relevant group is determined by means of the individual vehicle data. This group behavior is signalled in the reference vehicle, so that a driver is informed in good time about possible changes or hazards within his relevant group of vehicles. Accidents and tailbacks may thus be recognised in time or avoided.

Determination of the relevant group of vehicles is preferably effected with the aid of a method for fractal-darwinian object generation, wherein an order or sequence, respectively, within a group of vehicles is continuously generated by considering the respective vehicle data and subsequent weighting of an eventual position likelihood. Hereby an accurate positioning or sequence of respective vehicles within a group may be determined already through a minimum number of vehicle data without employing costly positioning systems.

A respective maximum group to be examined may, in particular, result from a maximum reception range of a reception device. It may, however, also be determined through a maximum memory capacity.

As vehicle data, preferably an identification code for identifying a respective vehicle, a velocity value for indicating a current speed of the vehicle, and a distance parameter are used. The distance parameter representing a distance between the reference vehicle and the respective vehicles from among the maximum group to be examined may, for example, be deducted from the reception field strength of the respective emitted radio signal.

As further vehicle data, for example a deceleration/acceleration value for indicating a current deceleration/acceleration of the respective vehicle, a steering angle for indicating a current steering angle of the respective vehicle, a direction value for indicating a current absolute direction, a position value for indicating a current absolute position of the respective vehicle, and a brake signal value for indicating a current use of a brake device of the respective vehicle are conceivable. Moreover it is also possible to pass on a group behavior value as vehicle data which represents the current group behavior of a relevant group associated with the reference vehicle.

The information signalled in the reference vehicle may be made both visible and audible through indicator means. It may, however, also directly result in a control of the braking behavior of the reference vehicle or influence engine control, whereby, for example, automatic emergency braking may be performed.

In particular where a predetermined combination of individual vehicle data is present, i.e. of moving conditions of a respective vehicle, an emergency signal having a higher priority than the individual vehicle data signals may be generated. Thus it is possible, for example in the event of imminent danger, to pass this condition on as rapidly as possible to groups of vehicles located further behind, resulting in particularly rapid dissemination of information. In order to avoid a multiplicity of emergency signals, such an emergency signal is passed on in an amplified condition (repeater function) only if its reception field strength drops below a predetermined threshold.

BRIEF DESCRIPTION OF THE DRAWINGS

The invention shall now be described by way of the examples of particular embodiments by referring to the drawing, wherein:

FIG. 4 shows a table representing an example for the memorisation of respective vehicle data in memory means.

DETAILED DESCRIPTION OF THE INVENTION

Figure 1:
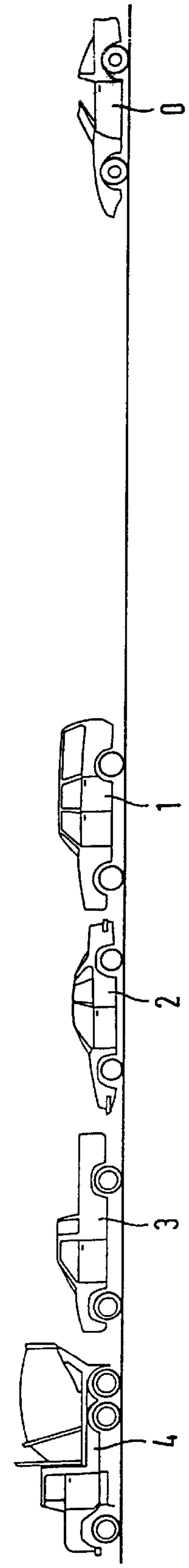
FIG. 1 is a schematic representation of a traffic situation on a country lane.

FIG. 1 is a schematic representation of a traffic situation likely to occur, for example, on a country lane. In FIG. 1, reference numeral 0 designates a reference vehicle, whereas reference numerals 1 to 4 indicate vehicles in a preceding column. Vehicles 0 to 4 each possess transmitting/receiving devices for transmitting their individual moving conditions or vehicle data, respectively, or receiving the vehicle data transmitted by the other vehicles. In the embodiment in accordance with FIG. 1, only the transmitting/receiving device of reference vehicle 0 shall now be taken into consideration, with particular focus on the data received by it. Herein it is assumed that reference vehicle 0 is travelling at a certain distance behind the column of vehicles made up of vehicles 1 to 4, however has no visual contact with the column as the road passes through a wooded area, for example.

It is assumed that at least one of vehicles 1 to 4 of the column includes a corresponding transmitting/receiving device like reference vehicle 0 and thus emits its individual vehicle data in the form of electromagnetic radio waves. The emitted vehicle data signals possess as minimum vehicle data an identification code IC identifying a respective vehicle, and a velocity value v indicating the current velocity of the respective vehicle.

It is moreover assumed that within the column a group classification or organisation (described later on) has already taken place, and the truck 4 recognised itself as the foremost vehicle followed by vehicles 3, 2 and 1 in this order. The group behavior of this column may, for example, be described through an approximately identical velocity of, for example, 50 km/h. If, now, the faster moving reference vehicle 0 coming up from behind arrives in the reception range of the radio signal of vehicle 1, the vehicle data thereof, i.e., at least the identification code IC of vehicle 1 and its velocity value v (50 km/h) are received and memorised at reference vehicle 0 with a predetermined reception field strength. This process is performed until—through decision criteria described later on—a relevance check is assumed to be fulfilled and vehicle 1 is recognised as a vehicle having relevance for reference vehicle 0. In the same manner, vehicles 2 to 4 are recognised as relevant vehicles, whereby a group of vehicles having relevance for reference vehicle 0 is constituted. Constitution and relevance criteria for the constitution of the relevant group of vehicles shall be described later on.

In this manner, reference vehicle 0 receives a multiplicity of vehicle data for the preceding column or relevant group of vehicles. By means of an evaluation device, the vehicle data of the relevant vehicles are evaluated and compared with the vehicle data of reference vehicles 0 or brought into relation with each other. In accordance with this comparison, generation of a signal is now performed in reference vehicle 0, which signal may, for example, consist of a visual or audible indication to reduce the speed. In this manner, an early warning may already issue long before visual contact with a respective relevant group of vehicles, whereby accidents are securely avoided.

The generated signal value can, however, not only provoke an audible or visible indication in reference vehicle 0, but also bring about automatic braking or acceleration.

In this way, a method and an apparatus for signalling local traffic disturbances are obtained which are extraordinarily flexible while not requiring any fixedly installed sensors or indicator means. The costs for a like system for signalling local traffic disturbances are therefore extremely low.

In order to enhance the accuracy of the system, further vehicle data may be acquired and transmitted. Such vehicle data are, for example, a deceleration value or acceleration value v indicating a current deceleration or acceleration of a respective vehicle, a steering angle θ indicating a current steering angle of the respective vehicle, a direction value DIR representing, for example, the current absolute direction of the respective vehicle by means of a compass, a position value POS indicating, for example, the current absolute position of the respective vehicle via a GPS system, or a brake signal value BREMS indicating a current use of a brake device of the respective vehicle. Moreover a recognised group behavior value, for example the average velocity of the entire group, may be emitted as a vehicle data, whereby linking of groups among each other into superordinate groups may result.

For determining the relevant group of vehicles 1 to 4, preferably a method for fractal-darwinian object generation is performed, as is known from German patent application No. DE 197 47 161 (filed on Oct. 24, 1997), for example. Herein a fractal, hierarchical object library is particularly adapted to the requirements of traffic situations, with property rules determining, for example, a particular running situation of the respective vehicle, context rules defining the order within the group of vehicles, and modification rules determining successive re-grouping of vehicles for example where overtaking takes place. The fractal, hierarchical object library herein possesses as basic objects typical traffic situations, for example for travelling on country lanes, on highways, or in dense city traffic. A multiplicity of vehicle data are typically examined for each vehicle in a particular group at time intervals, whereby for example the classification likelihood for a particular relation with a group or a particular position within a group iteratively increases.

As the use of the method for fractal-darwinian object generation constitutes a preferred method for determining the relevant vehicles or group of vehicles, the basic reflections of fractal-darwinian object generation shall hereinbelow be represented in a generalised manner.

In the following, only two-dimensional images, which are considered complex structures to be examined or objects having a complex interrelation, shall be taken into consideration. Such structures to be examined may, however, also be the above described traffic situations, wherein the individual vehicles combine into subordinate and superordinate objects or groups.

In the method described in the following, the recognition and generation for example of a traffic situation is understood to be a multi-scale or fractal and evolutionary or darwinian process. The single objects of a traffic situation are herein treated as independent "creatures" which are very vague, formal and unrealistic at the beginning of the method, however upon repeated execution of the method change and become more specific to the effect of better and better adapting to a library of known objects forming, as it were, the computer's wealth of experience.

Herein the objects are structured hierarchically. Large or superordinate objects are thus split up or disintegrated into sub-objects or subordinate objects, while small or subordinate objects are combined into large or superordinate objects. The method for adaptation of the objects to the object library thus takes place on several planes (scales). In comparison with the object library for this adaptation, on the one hand property rules for the objects, and on the other hand context rules between the objects and hierarchical structures are of importance.

For the optimum adaptation of any objects and structures in order to generate the most meaningful solution, evolutionary algorithms are employed. Use is made, i.a., of the general darwinian mechanisms briefly described hereinbelow:

Isolation, Attraction

In accordance with the present invention, isolation is understood to designate the delimitation of partial regions, for example of an image to be examined, from objects. This may be effected by splitting up or disintegration or segmentation according to particular algorithms. Preferably for segmentation a method is used wherein the similarity or pertinence between picture elements and picture segments is determined while taking homogeneity criteria into consideration. Vice versa, the small objects or subordinate objects may also be combined into large or superordinate objects. In this case, limitation of this grouping to a particular number of group members corresponds to isolation. For example, a hierarchical object structure may be generated largely in the absence of previous knowledge and thus lead to a hierarchical abstraction of any given set of data by combining smaller objects into larger objects, where the application of a homogeneity criterion leads to a value situated below a threshold. As a homogeneity criterion it is, for example, possible to employ the difference of the heterogeneity h weighted by the size of an object newly created by fusion or foundation, and the sum of the heterogeneities of the original objects $h_1$ and $h_2$, respectively weighted by the respective sizes $n_1$ and $n_2$, respectively. The difference $\Delta h_{weight}$ of the weighted heterogeneities after and before, i.e., the heterogeneity introduced by combination of two objects, results from the equation $$\Delta h_{weight}=(n_1+n_2)h_{new}-(n_1h_1+n_2h_2),$$

wherein this difference should be as small as possible.

Of any pairs of objects which may potentially be considered for a fusion or foundation, in particular always those are combined first which have the smallest difference of weighted heterogeneity introduced by the fusion or foundation. Where the difference of the weighted heterogeneity divided by the overall size ($\Delta h_{weight}$ ./. $(n_1+n_2)$) is situated below a predetermined threshold, objects are fused in the combination. A new superordinate object in turn is founded while maintaining, which means storing in the object library, the smaller objects, i.e., foundation of a new superordinate object, if this difference of the weighted heterogeneity divided by the overall size is situated above a predetermined threshold. A subordinate object potentially exchangeable between two objects will actually always be relocated if the weighted heterogeneity of the two objects is reduced by this exchange or this relocation in accordance with the equation, $$h_{weight\ after}<h_{weight\ before}\rightarrow n_{1after}h_{1after}+n_{2after}h_{2after}<n_{1before}h_{1before}+n_{2before}h_{2before}.$$

Thus a hierarchical object structure is generated from basic objects by foundations, disintegration, fusion, dissolution, subordination, exclusion from a group and re-grouping of objects. Herein a foundation involving the generation of superordinate objects is contrasted by disintegration for the generation of subordinate objects. Fusion for the generation of larger objects from a multiplicity of small objects is contrasted with dissolution for the generation of smaller objects from a large object. In subordination, objects are gathered and subordinated to a superordinate object. In contrast, in exclusion from a group, a subordinate object is expelled from a superordinate object. In re-grouping, an exchange of subordinate objects takes place.

The respective objects may have special relations with other group members. These relations or context rules are also referred to as attraction. In static images, attraction, or the relation in particular patterns, may find an expression in characteristic relative distances, size proportions or angles. In addition, each object is allotted predetermined properties reflecting, for example, its geometrical shape in n-dimensional space in a condensed manner, color distribution etc.

Alterations

It has already been mentioned that in a first run of the method, it is often not clearly definable what regions of a complex entity may meaningfully be termed an object. Splitting up or composition, respectively, into objects from these regions is therefore performed in an iterative manner. Accordingly, objects are at first generated preliminarily and later on iteratively modified increasingly purposefully. Objects are changed by excluding regions therefrom, for example subordinate objects, or incorporating adjacent regions, for example adjacent objects. Another manner of alteration is the change of the attractions or context rules, respectively.

A local alteration of an object might be considered a mutation. As there are, however, various possibilities of alterations apart from the local alteration, the general term alteration shall be used.

Selection, Fitness

The purpose of altering the respective objects is to optimise their "fitness" or "classification likelihood" with respect to the object library. The measure for their fitness or classification likelihood is assumed to be the similarity of their bundled properties with the properties of objects of the prepared object library. In the object library, a multiplicity of possible objects including their possible properties or property rules are stored, which are clearly more objects than in the object (e.g., image) under examination.

In addition, possible mutual relations or context rules of the objects, that is to say their attraction, may be described in the object library. The objects or structures found in the image will then also have a more or less high similarity, i.e. classification likelihood, with the possible attractions or context rules of the corresponding objects in the object library.

Variety, Mating

As a long-term memory it is further possible to employ variety of objects and object structures. That is to say, not only the absolutely best (highest classification likelihood) of these objects or structures will hold up or be further used, but also less good objects (lower classification likelihood). As a result, possibilities once found but presently constituting second-class options will not immediately be lost. This variety represents a memory for second- or third-class options. This is sensible inasmuch as what is second-class now may be superior in a later development phase. The variety of the possibilities of solution moreover provides, apart from mutation, for another type of alteration. This further type of alteration is referred to as "mating" or mixing and combination of different structures of solution.

Reproduction

In nature, through reproduction of a "successful" creature, the numbers of this type of creature are increased. This increases the import of the particular genetic code as it is then enabled to take effect in parallel in two locations. At first glance, an analogy for the objects in object generation with a sequentially working computer does not make sense. In a dynamic system, however, this may at second glance be quite useful even if it is a matter of one and the same approach to solution, or involves the same object. In a dynamic system, the surroundings of objects change. Therefore the importance of an object in object recognition or generation is raised by the fact that the object is treated several times, and thus the number is virtually increased. Where the reproduced objects are moreover altered, it will often be meaningful to store only one object plus the various alterations.

Deletion

For the number of possible solutions not to increase excessively through reproduction and thus unnecessarily slow down the optimisation process, some of the possible solutions must be deleted.

As the darwinian algorithms are very specific in part, it is not desirable to concurrently apply all possible kinds of algorithms for the entire image to be examined. Rather, it is sensible to start with very general, formal algorithms at the beginning of the method or "evolution", respectively. Through comparison with the object library a first level of cognition is attained herein, which may be used in order to utilise algorithms or alteration rules more purposefully. Hereby the classification likelihood, or fitness, may possibly be raised. Preferably algorithms may be used even more purposefully to result in increasingly sophisticated objects having individual meanings and an increasingly higher fitness or classification likelihood.

In the following, the multi-scale feature of the method according to the invention shall be discussed in detail, which plays an important role for the analysis of complex structures.

The similarity of an object of the item or image to be examined with the one of an object of the object library corresponds to a local fitness, or local classification likelihood. This local classification likelihood by itself is, however, not sufficient, inasmuch as ambiguity may furthermore also exist in the case of objects already having a very high fitness or classification likelihood, which means that a similarly high local fitness or classification likelihood with several objects of the object library exists. The meaning of a respective object will then often only become clear through its context rules or the structure of its subordinate objects.

Multi-scale, i.e., fractal manners of examination are therefore indispensable. The fractal treatment of a structure to be examined, for example of an image, thus requires a fractal-hierarchical object library, a fractal fitness or classification likelihood, a fractal alteration, and possibly fractal reproduction and fractal deletion. The fractal object library is a library having stored in it not only the properties or property rules of objects, but also the possible internal and external relations (internal and external context rules) as well as the alteration rules thereof. This means that in the fractal object library it is also stored of what possible subordinate objects the object may consist, including the possible relations of these subordinate objects, and what relations or contexts with superordinate objects the object may have. This consequently also involves hierarchical information, for the object is generally embedded in larger contexts and constituted of subordinate objects having their particular relations. From this hierarchical structure it is possible to determine a hierarchical or fractal fitness or classification likelihood by comparison with the hierarchical structures in the library.

Starting out from the local fitness or classification likelihood resulting from direct comparison of the object with the objects of the object library, a fractal fitness or classification likelihood composed of the local and hierarchical fitness is calculated based on this local fitness. By way of the alteration, these fractal classification likelihoods are then optimised.

Figure 2:
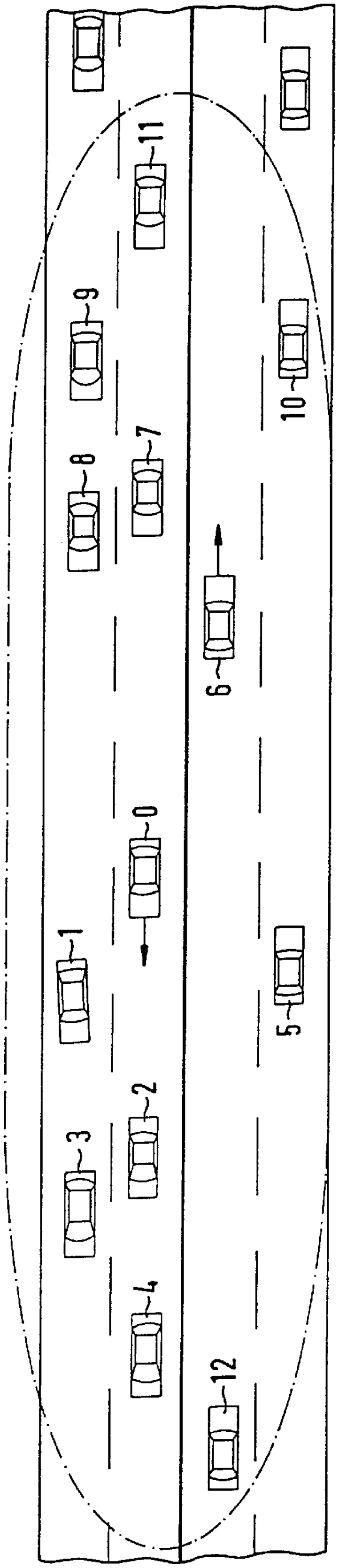
FIG. 2 is a schematic representation of a traffic situation on a multilane highway.

FIG. 2 shows another schematic representation of a traffic situation as existing, for example, on a highway.

Herein reference numeral 0 again designates a reference vehicle, while reference numerals 1 to 4 represent the vehicle or group of vehicles having relevance for reference vehicle 0 inasmuch as they precede vehicle 0 in the travelling direction. Reference vehicle 0 possesses for example a maximum reception range as indicated by the oval enclosure. A multiplicity of further vehicles are present within this maximum reception range apart from the relevant group of vehicles. On the one hand, reference numerals 5, 6, 10 and 12 designate the vehicles moving on the highway in the opposite direction but also situated within the reception range of reference vehicle 0. Reference numerals 7, 8, 9 and 11 moreover designate vehicles moving in the same travelling direction as reference vehicle 0, however located behind it and thus to be taken into consideration for reference vehicle 0 not primarily or in a lesser degree. All vehicles transmit and receive in more or less regular intervals, or continuously, vehicle data signals containing the respective vehicle data. A multiplicity of vehicle data thus arrive, for example, at reference vehicle 0, which are, for example, represented in FIG. 4 in simplified form as a table.

FIG. 4 shows a simplified representation of a table-type storage of the minimum vehicle data for the respective vehicles 0 to 12. In the left-hand column, for example, the respective identification code of a received vehicle data signal is filed in binary form (0000 to 1100). In the further columns, respective vehicle data received at times $t_{n-3}$, $t_{n-2}$, $t_{n-1}$ and $t_n$ are filed in the form of a velocity value v and a respective reception field strength E.

The first row of the table in accordance with FIG. 4 represents the vehicle data of reference vehicle 0 which serves as comparison reference values for the further vehicle data. The reception field strength E is consequently not entered.

The table in accordance with FIG. 4 shall now be described in detail.

It is assumed that the reference vehicle has a velocity v of 120 km/h. Vehicles 1 and 3 travelling on the right-hand lane of the highway have the same velocity v1 and v3 of 100 km/h so as to present increasing reception field strength values for various times $t_{n-3}$ to $t_n$. The reception field strength increases inasmuch as owing to the overtaking process of reference vehicle 0, the distance from vehicles 1 and 3 is reduced. In comparison, vehicles 2 and 4 present the same velocity v2 and v4 of 120 km/h so that their reception field strength remains constant in proportion with the distance from reference vehicle 0.

The remaining values for the velocities and the reception field strengths of the further vehicles 5 to 12 result analogously. It is, however, noted that in particular the oncoming vehicles 5, 6, 10 and 12, owing to the very high relative velocity (for example, v0–v12=240 km/h), merely leave one data value in the memory preferably having the form of a circulating register in the time frame of the selected embodiment upon passage through the maximum reception range of reference vehicle 0. This circumstance may be utilised, for example, as a criterion for object recognition or object generation in order to exclude vehicles 5, 6, 10 and 12 being a non-relevant group, or classify them as an oncoming group, respectively. In the same manner, a group of upcoming vehicles 7, 8, 9 and 11 may be determined through corresponding classification criteria if, for example, a check of the respective deceleration periods with respect to the braking or acceleration process is performed within the fixed group.

The group of vehicles 1 to 4 having relevance for the reference vehicle 0 is determined in a similar manner. Herein a more accurate classification may take place, for example, for the immediately preceding vehicles 2 and 4 and vehicles 1 and 3 running in the adjacent lane. Classification into such a multiplicity of subordinate and superordinate groups or objects is performed in the customary, above described fractal-darwinian manner of proceeding. Where a group of vehicles, e.g., vehicles 2 and 4, are classified to be a particularly relevant group, then their respective group behavior may, for example, be determined through arithmetically averaging their average velocities, their deceleration behaviors, etc., and compared with the vehicle data of reference vehicle 0. Based on these comparisons, signalling is now performed, with indication having the form, e.g., of known traffic symbols, i.e., speed limits, or any other visual or acoustic manner. There is, however, also the option of evaluating the group behavior of the relevant group such that when a a particular threshold is exceeded, for example when automatic emergency braking of reference vehicle 0 takes place. In this respect a multiplicity of further control measures are conceivable, such as, for example, steering or acceleration control.

In the above described embodiment, the parameter having significance for determining the distance of the objects or groups was determined with the aid of the reception field strength of the received radio signal. Besides the reception field strength, further signals or measured values may also be used as values proportionally to the distance between the respective vehicles and the reference vehicle.

Figure 3:
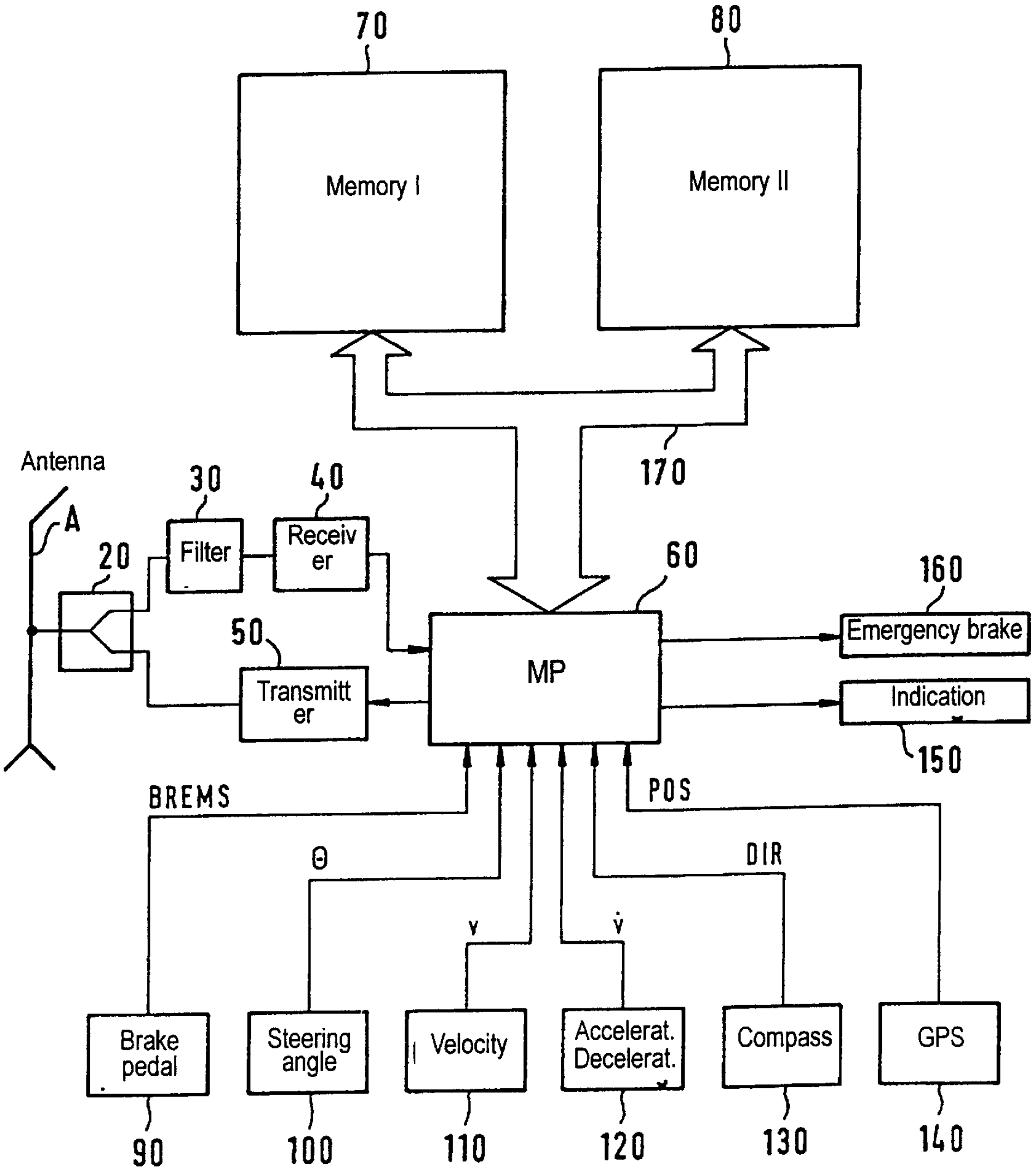
FIG. 3 is a block diagram of the apparatus for signalling local traffic disturbances in accordance with a preferred embodiment.

FIG. 3 shows a block diagram of the apparatus for signalling local traffic disturbances in accordance with a preferred embodiment.

In FIG. 3, reference numeral 10 designates a transmitting or receiving antenna, reference numeral 20 designates a duplexer filter for separating the reception channel from the transmission channel, reference numeral 30 designates filter means whereby the respective radio signals of the respective vehicles are filtered out in accordance with their identification codes, reference numeral 40 designates a receiver, and reference numeral 50 designates a transmitter. The filter means 30 may moreover comprise a detector for detecting the reception field strength of the respective radio signal. The receiver 40 and the transmitter 50 are connected to a microprocessor 60 serving the function of controlling the transmitting/receiving device. Reference numerals 90 to 140 designate a multiplicity of detection means for detecting the respective vehicle data of the vehicle. Reference numeral 90 designates detection means for detecting use of a brake pedal. Reference numeral 100 designates detection means indicating a value Θ corresponding to a current steering angle. Reference numeral 110 designates detection means representing the current speed value v of the vehicle. Reference numeral 120 designates detection means indicating a current acceleration or deceleration value v of the respective vehicle. In addition, the apparatus in accordance with FIG. 3 may comprise a compass 130 indicating a direction signal DIR which represents the current travelling direction of the respective vehicle. Moreover a GPS system (global positioning system) may be employed which presents an absolute position value POS for indicating a current absolute position. The detection means 90 to 140 are, for example, connected to an input port of the microprocessor 60, and output signals of the detection means 90 to 140 are emitted as vehicle data either via the transmitter 50 and the antenna 1 to the other vehicles or used for a comparison of the received vehicle data with the local vehicle data.

Reference numeral 70 designates first memory means wherein, for example, the table represented in FIG. 4 may be filed. The first memory means 70 preferably are constituted of a circulating register, the memory locations of which are repeatedly inscribed in predetermined time intervals. It may thus, for example, be made sure that a respective vehicle data received last is filed in the first memory means 70.

For the case that fractal darwinian object generation is used as a method for determining the relevant group of vehicles, the apparatus for signalling local traffic disturbances moreover includes second memory means 80. The fractal hierarchical object library is then provided in these second memory means 80.

The first memory means 70 and the second memory means 80 are connected through a bus system 170 including the microprocessor 60 whereby data exchange is ensured. If the microprocessor notes upon evaluation of the vehicle data that the group behavior of its associated relevant group is in contradiction with its own vehicle data, e.g., the velocity of the relevant group is substantially lower than the velocity of its associated vehicle, signalling takes place either through the indicator means 150 or through a control device 160. In the indicator means 150, the respective signal is indicated visibly and/or audibly, wherein preferably the known signs may be used for a speed limitation. In addition there is the option of introducing, for example, automatic emergency braking via the control device 160 if the evaluation of the received vehicle data with the local vehicle data amounts to a situation of imminent danger.

Such a situation of imminent danger may also be transmitted to the other vehicles with the aid of an additional emergency signal having a higher priority, whereby in a particularly effective manner for example a multiple crash of vehicles may be avoided. In order to ensure maximum dissemination of the emergency signal, the receiver 40 includes a threshold discriminator evaluating emergency signals only below a particular reception field strength and re-emitting them in amplified form via the microprocessor 60 and the transmitter 50, thus resulting in a repeater function. Herein the repeated and amplified emission of the emergency signal has the same identity code as the vehicle originally emitting the emergency signal.

Inasmuch as the repeater function allows for an extraordinarily large range beyond the respective groups, each vehicle may individually perform a relevance check with respect to the received emergency signal. Herein it is examined whether vehicle that originally emitted the emergency signal pertains to a group which may be irrelevant for the respective vehicle in any way whatsoever. A repeater function would not take place in this case.

In a preferred manner, the ignition key activates transmitter and receiver of the respective vehicles. Parking vehicles are thus automatically excluded from the relevant groups of vehicles.

Owing to the limited transmission or reception range, a maximum group of vehicles to be examined is already generated for each vehicle. This group may, however, depending on need or situation, be expanded or restricted such as, e.g., by:

- purposely expanding or delimiting the range of transmission and/or reception;
- passing on received information, i.e., vehicle data (as the information may be passed on and on, an enormous range is conceivable.)
- purposely addressing a vehicle or a group having specific properties. This may be achieved through jointly emitting the identification code of the vehicles to be addressed, whereby a transmitting vehicle addresses the receiver having a specific property, such as, e.g., all those of its maximum group following behind the respective vehicle (transmitter directly determines group), or by emitting indirect information such as, e.g., "To all vehicles travelling in the same direction as the reference vehicle" (receiver decides whether or not he is being addressed).
- formation of subgroups and/or supergroups which are again and again determined anew individually by each vehicle. The supergroup is formed by interpretation of passed-on information: groups in proximity of the reference vehicle or close groups having a same travelling direction, wherein one group represents all vehicles within the set reception range, and a subgroup for example represents all vehicles meeting the reference vehicle and its group, all vehicles of the reference vehicle's group having a same travelling direction, all those having a similar running behavior (e.g., velocity), all vehicles located behind or in front of the reference vehicle, etc. Subordinate subgroups are, e.g., formed by all vehicles located behind the reference vehicle and accelerating, etc.,
- formation of subgroups and/or supergroups globally forming in a dynamic manner in accordance with predetermined rules (partly through agreement between the vehicles). Global segmentation (fractal-hierarchical grouping) has the advantage that group representatives exchanging relevant information between the groups may be determined.

For the determination of information necessary for group formation, the following parameters may be determined:

- determination of the relative distance (reference vehicle—other vehicle):
  - by measuring the field strength;
  - through temporal analysis of the driving patterns (e.g., the respective vehicle always brakes one second earlier than the reference vehicle. At a velocity of . . . the . . .);
  - by range finder.
- determination of the relative travelling direction of the vehicle from which the information was received:
  - by measuring the increase or decrease of the field strength;
  - by measuring the Doppler effect (when the relative position is determined);
  - by temporal analysis of the driving pattern;
  - by reception of absolute direction data (e.g., compass) and comparison with one's own direction data (of the reference vehicle).
- determination of the relative position (in front of reference vehicle—behind reference vehicle):
  - by measuring velocity differences (reference vehicle—respective vehicle) and comparison with changes of distance. Where the respective vehicle is faster than the reference vehicle, and the respective vehicle is located behind the reference vehicle, the distance of the respective vehicle from the reference vehicle must decrease;
  - by temporal analysis of the driving pattern (e.g., the respective vehicle mostly brakes earlier than the reference vehicle and consequently travels in front of the reference vehicle);
  - through radio direction finder transmitters or receivers.
- determination of the driving lane (passing lane or wrong side of the highway):
  - through road-side transmitters and comparison of the field strengths: wrong, correct—left, right;
  - by temporal analysis of the driving pattern.

Moreover by limiting the reception or transmission range in particular when using "burst" transmitters, the likelihood for simultaneous reception of various transmitters may be kept low. This manner of proceeding does, however, present the drawback that the number of information items received might become too small.

As a result, harmonisation of the transmitters may be more advantageous. This may be achieved through synchronisation or "group tuning" of the transmitters. Synchronisation may, for example, be performed centrally by using the radio clock signal.

In accordance with a preferred embodiment, transmission is effected in defined transmission blocks. After each block there is a pause before the next vehicle can transmit. When a group exists, the transmitters may among each other determine an order for their transmission blocks. This may, e.g., be the order in which the transmitters joined the group.

Groups approaching each other too closely and mutually disturbing each other may be "fused" with respect to transmission timing if they match with each other (e.g., same travelling direction) and if this will not unduly increase the group size. In a fusion it is, for example, possible to retain the original order within the original group, and the group from among which a member initially proposed the fusion may transmit first, followed by the second group. If the group would become unduly large as a result of a fusion, or if the two groups are not well matched (e.g., oncoming traffic), measures must nevertheless taken for them not to transmit simultaneously. This may, e.g., be achieved with the aid of a "zipper" or interleaving method. In other words, depending on how many groups meet, each of the groups increases the transmission pauses between individual transmissions such that the members of the other groups will fit in between.

There will, however, frequently be a rather continuous flow of traffic which may be branched in the manner of a network. As not all vehicles of a large network can be synchronised with each other, groups must be created artificially. This may be achieved in accordance with a fractal-hierarchical method. Vehicles may form groups, vehicles may be admitted by a group, groups may be fused, group representatives may be determined, groups may be disintegrated, and/or supergroups may be formed. When a transmitter approaches a group, it may be incorporated together with its group (where present) by transmitting its desire of being admitted in the transmission pauses of the other ones.

Transmission pauses are thus necessary not only to enable group dynamics, but also for transmission of a signal (emergency signal) having a high priority (accident, emergency braking).

Another type of synchronisation group formation would result from a specific paired synchronisation:

It is assumed that there exists a group that someone else would like to join. Each new arrival will initially only receive until able to assess the situation, then introduce itself in a transmission pause. The order of all participants will then shift.

Where the vehicle which joined the group prior to the reference vehicle has the transmitting number n, the reference vehicle will have the transmitting number n plus 1. If n plus 1 is above a threshold, the reference vehicle will have the number one, however with a 180-degree phase shift. The reference vehicle thus represents the first member of the second group. The reference vehicle then transmits in the enlarged transmission pauses of the preceding vehicles. The transmitter behind the reference vehicle is then number 2 with a 180-degree phase. As soon as the maximum number is reached in the group of the reference vehicle, the sequence continues with number 1 and 0-degree phase of a third group. The third and first groups now transmit in synchronicity. If they are far enough from each other, they will not disturb each other.

Whenever groups disturb each other, the "zipper" method becomes valid.

In order to avoid excessive disturbance between neighboring groups, it would also be possible to slightly shift the transmit frequencies instead of the above described phase shift of the transmission timings, so that neighboring groups (just about) cannot receive each other any more. In order for information from one group to nevertheless reach another group, group representatives might be determined (e.g., the vehicles which were last to join) which then operate simultaneously on a plurality of frequencies.

What is claimed is:

1. A method for signalling local traffic disturbances, comprising the steps of:

determining a maximum group of vehicles to be examined associated with a reference vehicle through reception of at least one individual vehicle data signal;

repeatedly evaluating the at least one individual vehicle data signal and storing as individual vehicle data of at least one vehicle from among the maximum group of vehicles to be examined;

determining at least one group of vehicles having relevance for the reference vehicle within the maximum group of vehicles to be examined by evaluating the individual vehicle data by fractal-darwinian object generation;

determining a group behavior of the at least one relevant group of vehicles by evaluating the respective individual vehicle data of vehicles within the relevant group of vehicles; and signalling information corresponding to the group behavior of the at least one relevant group of vehicles;

wherein relevant information is passed on to other vehicles or groups of vehicles.

2. The method according to claim 1, wherein the method for fractal-darwinian object generation comprises the following steps:

preparing a fractal, hierarchical object library with predetermined objects and related property, context and modification rules;

forming basic objects in a hierarchical object structure including subordinate and superordinate objects;

comparing the basic objects with the objects of the fractal, hierarchical object library, wherein a respectively formed basic object is evaluated to be unknown if no corresponding object having the corresponding property rules exists in the fractal, hierarchical object library, a local classification likelihood is allocated to the respective formed basic object having the property rule if a corresponding object exists in the fractal, hierarchical object library, or several local classification likelihoods are allocated to the basic object having said property rule if several corresponding objects exist in said fractal, hierarchical object library;

applying said context rules to the respective objects in order to form and calculate respective fractal classification likelihoods;

applying said modification rules to the respective objects in order to optimize the fractal classification likelihoods; and iteratively executing the steps of applying the context rules and the modification rules for stepwise improvement of the fractal classification likelihoods.

3. The method according to claim 1, wherein the maximum group of vehicles to be examined and associated with the reference vehicle is determined through a maximum reception range of its receiver.

4. The method according to claim 3, wherein the maximum reception range is a variable range of the receiver which is set in dependence on at least one of a determined traffic density and a reception disturbance resulting from overlap of the received vehicle data signals.

5. The method according to claim 1, wherein the individual vehicle data include:

an identification code for identifying a respective vehicle;

a velocity value for indicating the current speed of the respective vehicle; and a distance parameter for indicating a distance between the reference vehicle and the respective vehicles from among the maximum group of vehicles.

6. The method according to claim 5, wherein the individual vehicle data include at least one of:

a deceleration/acceleration value for indicating a current deceleration/acceleration of the respective vehicle;

a steering angle for indicating a current steering angle of the respective vehicle;

a direction value for indicating a current absolute direction of the respective vehicle;

a position value for indicating a current absolute position of the respective vehicle;

a brake signal value for indicating a current use of a brake device of the respective vehicle;

group behavior values for indicating the current group behavior of a group of vehicles to be examined and associated with the respective vehicle;

an emergency signal value for indicating a current emergency situation of the respective vehicle.

7. The method according to claim 6, wherein in accordance with a combination of predetermined individual vehicle data of a respective vehicle, the emergency signal having priority over the individual vehicle data value is generated.

8. The method according to claim 1, wherein depending on the signalled information, vehicle control is performed in the reference vehicle by a control device.

9. The method according to claim 8, wherein the control is at least one of an engine control and a brake control.

10. Apparatus for signalling local traffic disturbances, including:

detection means for detecting local vehicle data to be transmitted;

a transmitting/receiving device for transmitting/receiving radio signals containing respective vehicle data to be transmitted/received;

a field strength detection means for detecting a respective field strength of the respective received radio signals;

first memory means for storing the respective received vehicle data as a maximum data group to be examined in accordance with an identity code allocating each radio signal to its respective transmitting vehicle, a time value, and the reception field strength of the respective radio signal;

second memory means for storing a fractal, hierarchical object library;

an evaluation device for evaluating the data of a maximum data group to be examined, using a fractal darwinian object library to perform fractal-darwinian object evaluation wherein at least one relevant data group is determined;

a determining device for determining a signal value in accordance with the data of the at least one relevant data group and the local vehicle data; and signalling means for signalling the determined signal value, a field strength detection means for detecting a respective field strength of the respective received radio signals;

memory means for storing the respective received vehicle data as the maximum data group to be examined in accordance with an identity code allocating each radio signal to its respective transmitting vehicle, a time value, and the reception field strength of the respective radio signal, wherein relevant information is passed on to other vehicles or groups of vehicles.

11. The apparatus according to claim 10 wherein said detection means includes at least one of a brake signal sensor, a steering angle sensor, a velocity sensor, an acceleration/deceleration sensor, a direction sensor, a position sensor and an emergency signal sensor.

12. The apparatus according to claim 10, wherein the detection means includes a group behavior value determining device indicating the current group behavior of a relevant group of vehicles associated with the respective vehicle.

13. The apparatus according to claim 10 wherein said signalling means is an indicator means for at least one of audibly and visually representing the determined signal value.

14. The apparatus according to claim 10 wherein said signalling means is a control device for performing at least one of engine control and brake control.

15. The apparatus according to claim 10 wherein said transmitting/receiving device includes a detector device for recognizing a received emergency signal and passing on a corresponding amplified emergency signal when the reception field strength is below a specific reception field strength.

16. The apparatus according to claim 15, wherein the received emergency signal presents at least one of an emergency signal value and a group behavior value of the vehicle emitting the emergency signal.

17. The apparatus according to claim 16, further including an emergency signal evaluation device for evaluating the group behavior values associated with the emergency signal and adding them to the emergency signal to be passed on.

18. The apparatus according to claim 17, wherein the group behavior value pertaining to the emergency signal is a distance between the vehicle transmitting the emergency signal and the vehicle receiving the emergency signal, and the evaluation device adds up the respective distances into a total distance when passing on the emergency signal.

* * * * *